April 8, 1969

D. T. BEST 3,437,829

TRANSMISSION LINE PUMPING SYSTEM FOR PARAMETRICALLY EXCITED OSCILLATORS

Filed Oct. 2, 1964

INVENTOR
DONALD T. BEST

BY

ATTORNEY

United States Patent Office 3,437,829
Patented Apr. 8, 1969

3,437,829
TRANSMISSION LINE PUMPING SYSTEM FOR PARAMETRICALLY EXCITED OSCILLATORS
Donald T. Best, Plymouth Meeting, Pa., assignor to Sperry Rand Corporation, New York, N.Y., a corporation of Delaware
Filed Oct. 2, 1964, Ser. No. 401,137
Int. Cl. B61f *17/00;* F16c *1/24*
U.S. Cl. 307—88                    7 Claims

ABSTRACT OF THE DISCLOSURE

A system for exciting a plurality of parametrons is disclosed. The system comprises a transmission line which has a pump source connected at one end thereof and to which a plurality of parametron circuits are connected. Each parametron comprises a pair of reactive elements. The reactive elements of each parametron are connected to corresponding points above and below the electrical mid-point of the transmission line.

---

This invention relates to electrical line connections for alternating current circuits, and, in particular, to electrical connections for parametrically excited resonators which are suitable for use in an electronic data processing system.

An oscillation can be produced in a resonance circuit by varying the parameters of the resonance circuit with an exciting wave having a frequency twice that of the resonance frequency of said resonant circuit. This phenomenon is called "parametric excitation of oscillation," and such resonant circuit is called a "parametrically excited resonator." Hereafter, the parametrically excited resonators will be called "parametrons" or parametric trigger circuits. The oscillation phase of a parametron can be either one of two phases which are different by 180°, for example, 0 radian and $\pi$ radian. Accordingly, when a weak alternating current, having a frequency equal to the oscillation frequency of the parametron, is applied to the resonance circuit of the parametron at the same time as or slightly prior to the application of the exciting alternating current wave, the oscillation phase of said parametron is controlled to either one of 0 radian or one of $\pi$ radian according to the phase of said weak alternating current. The exciting wave, having a frequency about twice that of the resonance frequency together with a D.C. bias where applicable, is termed a pump source.

When a large number of parametrons are commonly excited by a pump source, the propagation delay along the pump transmission line causes the phase of the various parametrons to differ so appreciably that ambiguity in interpreting the phase of a given parametron (0 or 180°) may result.

Some logic systems employ numerous parametrons coupled together in an interconnecting fashion. However, generally, as the number of parametrons are increased and the frequency of oscillation employed is increased, the reliability of the system decreases and the control of the phase of oscillation of the resonance (tank) circuits becomes less accurate because of deviations from the nominal phases of 0° or 180°. In addition, the electrical phenomenon known as "noise" can provide undesired signals in the circuit.

Therefore, it is an object of this invention to provide a novel "pumping" connection for parametric trigger circuits which eliminates most of the difficulties with propagation delay along the pump transmission line.

Another object of this invention is to provide novel logic systems which employ parametric trigger circuits which provide greater reliability of such circuits and more accurate control of the phase of oscillation of the tank circuits.

Yet another object of this invention is to provide for novel noise cancellation of parametric oscillator circuits.

Still another object of this invention is to make parametric trigger circuits more practical by enabling the use of higher frequency pump sources, thereby raising potential clock rates to more desirable values.

Another object of this invention is to provide a novel logic system employing parametric trigger circuits wherein the phase of each of the circuits on a given clock phase is identical.

In accordance with one embodiment of this invention, the pump line for an individual parametric trigger circuit is coupled so that one half of the circuit experiences pump current early in time and the other half experiences the pump current late in time, whereby the overall effective pump current occurs at the proper time. In a preferred embodiment of this invention including $n$ parametric excited circuits each having a first and a second pump winding, the first pump winding for the first parametron, the first pump winding for the second parametron, ... the first pump winding for the $n$th parametron, the second pump winding for the $n$th parametron, ... the second pump winding for the second parametron, and the second pump winding for the first parametron are serially connected together in the order named, thereby forming what may be termed an "excitation path," whereby the "excitation path" is coupled to the pump source.

In another embodiment of this invention, the pump windings of the parametrons are serially connected together in the order named in the preceding paragraph, forming the excitation path. Following such serial connection however, the pump transmission line is coupled parallel and adjacent to the excitation path, but in the opposite direction, to form a "cancellation path," the end of the cancellation path being returned to the pump supply source, whereby cancellation of noise due to magnetic flux coupling into the coils is provided by such physical arrangement.

Other objects and advantages of this invention, together with its construction and mode of operation, will become more apparent from the following description, when read in conjunction with the accompanying drawing, in which.

Figure 1:
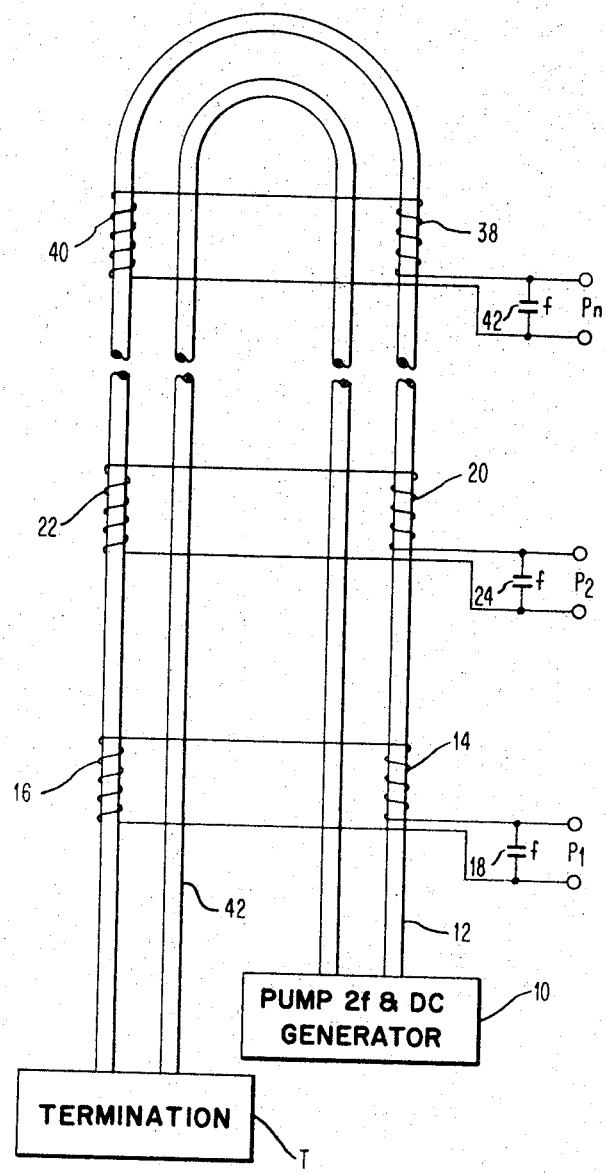
FIG. 1 is a diagram of one embodiment of this invention.

Referring to FIG. 1, there is shown a pump source 10, which provides alternating current at a frequency $2f$ together with a direct current bias, for providing current onto a magnetically plated wire 12 which plated wire 12 acts, in part, as a pump transmission line. A plurality of parametric trigger circuits (e.g., parametrons) $P_1$, $P_2$, $P_n$ are each coupled to the magnetically coated wire 12 by means of a respective pair of pump windings wound about the coated wire 12. The parametron $P_1$ includes a first pump winding 14 and a second pump winding 16 each winding 14, 16 being wound around the wire 12, each winding 14, 16 being serially coupled together to form a closed loop with a capacitor 18. The parametron $P_2$ includes a first pump winding 20, a second pump winding 22, and a capacitor 24 coupled together in a closed loop to form a tuned circuit. The parametron $P_n$, in a similar fashion, includes a first pump winding 38 and a second pump winding 40 serially connected with a capacitor 42. Output terminals are provided for each of the parametrons across their respective capacitors 18, 24, 42. The pump line or plated wire 12 is coupled from the generator 10 to the first pump winding 14 for the parametron $P_1$, the first pump winding 20 for the parametron $P_2$, . . . the first pump winding 38 for the parametron $P_n$, the second pump winding 40 for the parametron $P_n$, . . . the second pump winding 32 for the parametron $P_2$, and the second pump winding 16 for the parametron $P_1$ in the order named. The plated wire 12 is then coupled through a suitable termination T from whence a return wire 42 (which may or may not be magnetically coated, as desired) is returned back to the pump generator 10, in close proximity to the pump windings 16, 22, 40, 38, 20, 14, in the order named. Preferably, the return wire 42, in order to form an effective "cancellation path," is magnetically coated (similar to the plate wire 12) in order to cancel noise generated into the excitation path.

The wires 12 and 42 form a pump transmission line having a fixed characteristic impedance; the termination T may include a resistor equal to the characteristic impedance of the line. Other suitable terminations may be provided, however, and it is not essential that the termination T be fixed to the characteristic impedance, it being the preferred embodiment.

Each of the parametrons $P_1$, $P_2$, $P_n$ is tuned to oscillate, respectively, at a fixed frequency $f$ which is one-half of the applied pump frequency $2f$.

Figure 3:
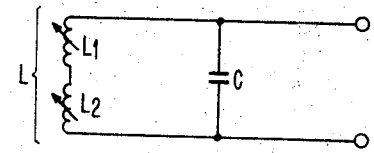
FIG. 3 is a diagram of an electrical circuit useful for understanding the concepts of this invention.

An equivalent circuit for each of the parametrons of FIG. 1, is illustrated in FIG. 3, wherein, for example, parametron $P_1$, the capacitor 18 of FIG. 1 is represented by a capacitance C in FIG. 3. The inductance $L_1$ represents the effective inductance of the first pump winding 14 and the inductance $L_2$ represents the effective inductance of the second pump winding 16. The two inductances $L_1$, $L_2$ are added together to form an inductance L, whereby the inductance L and the capacitor C form a tuned circuit resonant at the frequency $f$. In parametrically exciting each of the parametrons $P_1$, $P_2$, $P_n$, pump current at the frequency $2f$ is applied along the pump line 12 which effectively alters the inductance $L_1$ and $L_2$ of the various parametrons. The inductances $L_1$ and $L_2$ are each varied in accordance with a fixed sinusoidal relationship at a frequency $2f$. Where the length of the line 12 is significant, a phase shift between the values of both inductances $L_1$ and $L_2$ take place as set forth hereinbelow.

In the usual parametron operation, the inductance L is varied in accordance with the expression $$L = L_0 + \Delta L \sin 2\omega t$$

The total effective inductance L of a parametron described herein is equal to the sum of the inductances of both windings $L_1$, $L_2$, that is, $L = L_1 + L_2$. Let the phase of the current halfway down the pump transmission line (at the bend) be considered zero. Then at a parametron at some other position, the current leads by some phase angle $\phi$ in one coil, and lags by the same phase angle in its other coil. When $L_1$ and $L_2$ nominally each is one-half the total inductance and wherein the exciting current for the first winding occurs at an earlier time than the exciting current of the second winding, the effective overall inductance L is calculated in accordance with the following:

$$L = \left[\frac{L_0}{2} + \frac{\Delta L}{2} \sin (2\omega t + \phi)\right] + \left[\frac{L_0}{2} + \frac{\Delta L}{2} \sin (2\omega t - \phi)\right]$$

whereby $L = L_0 + \Delta L (\cos \phi) \sin 2\omega t$. Thus, the inductance of each parametron effectively is varied at the same phase, only the amplitude of the inductance variation, that is $\Delta L (\cos \phi)$, being affected by the phase of the pump.

Figure 2A:
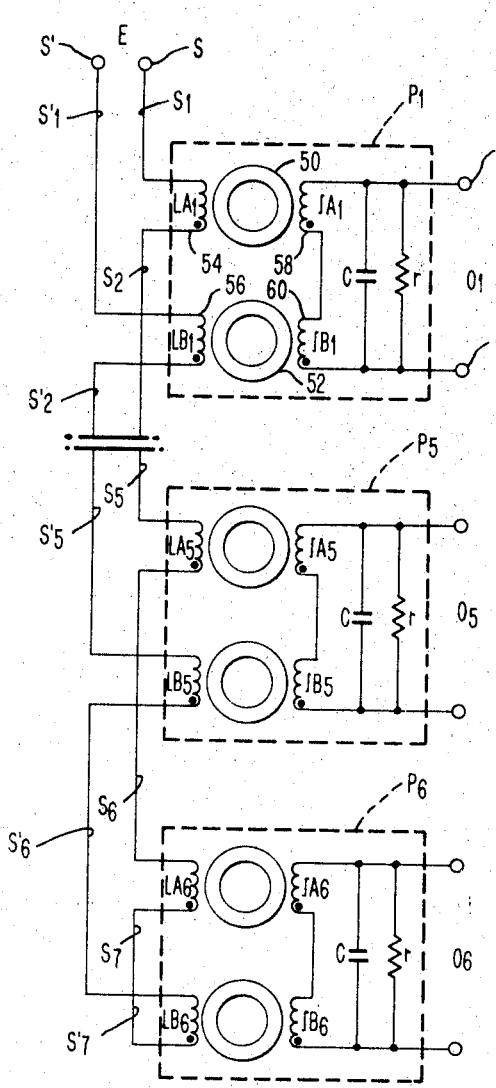
FIG. 2A is a diagram of another embodiment of this invention, wherein the inductive elements of the resonators are parametrically excited.

In a similar pump winding connection scheme, parametrons may be provided which utilize ferrite cores. As illustrated in FIG. 2A, a parametron $P_1$ comprises a pair of ferrite cores 50, 52 having a pair of pump windings 54, 56, respectively, wound thereon as coils $L_A$, $L_B$. Output windings 58, 60, respectively, are coupled to the two cores 50, 52 in series opposition providing inductances $l_A$, $l_B$, respectively, to form a closed loop with a capacitor C. A terminating resistance $r$ is applied across the capacitor C, if desired, and output terminals 66, 68 across the capacitor C are provided for receiving signals therefrom. Each of the parametrons $P_2$, $P_3$, $P_4$, $P_5$, and P is constructed in a manner similar to parametron $P_1$. A pump source E (not shown) is provided for generating current along a line $S_1$ directly to the pump winding $L_A$ of the parametron $P_1$, and hence (via the line $S_2$) to the pump winding $L_A$ of the parametron $P_2$, and so on, through to line $S_6$ to the pump winding $L_A$ of the parametron $P_6$, and then by way of line $S_7$–$S'_7$ to the pump winding $L_B$ of the parametron $P_6$, then to line $S'_6$ to the winding $L_B$ of the parametron $P_5$, and so on through the line $S'_2$ to pump winding $L_B$ of parametron $P_1$ and hence via the line $S'_1$ to return to the source E.

Figure 2B:
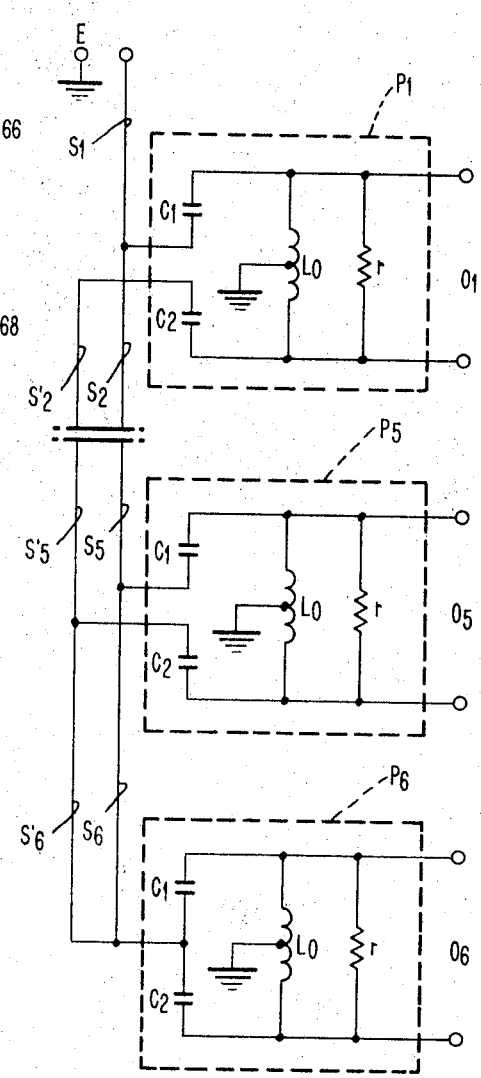
FIG. 2B is a diagram of an embodiment similar to that illustrated in FIG. 2A wherein the capacitive elements of the resonators are parametrically excited.

In a similar manner, as shown in FIG. 2B, the variable capacitance type of parametric circuitry is coupled in a manner so that an effective phase shifting takes place. Each of the parametrons $P_1$, $P_2$, $P_3$, $P_4$, $P_5$, $P_6$ of FIG. 2B include an inductance $L_0$ and a pair of variable capacitors $C_1$, $C_2$ coupled together in a closed loop to form a tank circuit resonant at a frequency $f$. The inductance $L_0$ is center tapped to a point of reference potential such as ground; a suitable damping resistor $r$ is coupled across the inductance $L_0$ from whence an output signal 0 is provided.

The pump source E provides a pump signal at some even multiple of the resonant frequency, such as frequency $2f$. A pump line S from the source E includes a direct connection $S_1$ from the source to capacitor $C_1$ of the parametron $P_1$. A section $S_2$ directly connects the capacitors $C_1$ of the parametrons $P_1$ and $P_2$. A section $S_3$ directly connects the capacitors $C_1$ of the parametrons $P_2$ and $P_3$. Likewise, the sections $S_4$, $S_5$ and $S_6$ directly connect the parametrons $P_3$ and $P_4$, $P_4$ and $P_5$, $P_5$ and $P_6$, respectively. The capacitors $C_1$, $C_2$ of the parametron $P_6$ are directly connected together. A section $S'_6$ directly connects the capacitors $C_2$ of the parametrons $P_6$ and $P_5$. Sections $S'_5$, $S'_4$, $S'_3$ and $S'_2$, respectively, directly connect the capacitors $C_2$ of the parametrons $P_5$ and $P_4$, $P_4$ and $P_3$, $P_3$ and $P_2$, $P_2$ and $P_1$, respectively. The effective capacitance $C_0$ of one of the tank circuits is calculated from the equation:

$$\frac{1}{C_0} = \frac{1}{C_1} + \frac{1}{C_2}$$

With an effective voltage, $E \sin 2\omega t$, applied to the parametrons, the capacitance $C_1$ and $C_2$ are varied in accordance with the equations:

$$C_1 = \frac{Q}{E \sin (2\omega t - \phi)}$$

$$C_2 = \frac{Q}{E \sin (2\omega t + \phi)}$$

Therefore, $$\frac{1}{C_0} = \frac{E \sin (2\omega t - \phi)}{Q} + \frac{E \sin (2\omega t + \phi)}{Q}$$

$$C = \frac{Q}{E (\cos \phi) \sin 2\omega t}$$

Hence, the effective capacitance of each of the parametrons is varied in phase with one another.

By practising the present invention, parametric trigger circuits are made more practical because a designer has the opportunity to utilize higher frequency pump sources, thereby raising potential clock rates to more desirable values. Thus, computers can be operated at higher and faster speeds than heretofore known.

The phase of oscillation of a parametric oscillator is dependent to a large extent on the phase of the A.C. pump applied to the oscillator. In a logic system employing such oscillators as parametric trigger circuits, it is desirable to have the phase of each of the circuits on a given clock phase identical, because the outputs of these circuits are to be gated together in a majority logic fashion and it may be necessary for the output of one circuit to completely cancel another.

A set of parametric trigger circuits is normally, in the prior art, serially connected to a common pump line. The pump line, being a transmission line, has a propagation delay characteristic. The pump current, thus experienced by each trigger circuit, is phased differently for each circuit. This is, of course, particularly significant for higher frequency systems where a substantially physically short line represents a relatively large portion of the wave length at the pump frequency.

By "splitting" the windings of the parametric trigger circuits in the manner described above in accordance with this invention, such that one half experiences a pump current appearing early in time and the other half sees a pump current late in time, the overall effective pump current occurs at exactly the correct time.

By bending the pump line into a hair pin shape, as illustrated in FIG. 1, to form a two wire transmission line with a plurality (e.g., three) of trigger circuits attached to the line, the parametron $P_1$ has half its inductive windings near the source of pump current and half near the termination. The parametron $P_n$ has both inductive windings near the midpoint of the line. Parametron $P_2$ has its windings between those of $P_1$ and $P_n$. Assuming the windings of the parametron $P_n$ experience a pump current having a reference phase 0, one winding of the parametron $P_1$ leads the reference phase by an angle $\phi_1$, while the other winding lags by the angle $\phi_1$. One winding of the parametron $P_2$ leads by an angle $\phi_2$ while the other winding lags by the angle $\phi_2$.

The effective pump current at each parametron is at the same phase, and hence to the extent that the phase of oscillation voltage of the tank circuits are dependent upon the phase of the pump current, the parametrons will all oscillate with no phase difference among them. The parametrons each oscillate at one of two phases; hence one parametron oscillates at the same phase or $\pi$ radians out of phase with respect to another parametron.

Although a slight amplitude variation in the effective pump current among the three circuits may take place, such variation is not disadvantageous. Above a threshold value, the amplitude of the pump current is not critical, and, in the vicinity of $\phi=0$, the function $\cos \phi$ does not change rapidly and is nearly equal to unity.

It is desirable to set the amplitude of the pump current for the central parametron $P_2$ at the nominal value, so that the pump current for the remaining parametrons is near the desired value.

In a practical embodiment, allowing for a reasonable amplitude tolerance, such as ±4%; assuming a slow velocity of propagation approximately 25% that of free space; and assuming a pump frequency of 10 megacycles per second, a permissible pump line length of 52 inches is suitable. By utilizing merely four coils per inch, which is easily attainable, the pump line can accommodate 208 coils or 104 parametric trigger circuits.

In view of the teachings of this invention, many variations will be apparent to those skilled in the art, and, thus, having described this invention, it is desired that this invention be construed broadly and that it be limited solely by the scope of the allowed claims.

The embodiments of the invention in which an exclusive property or privilege is claimed are as follows:

1. In a system comprising a plurality of parametron oscillators each of which comprises a pair of reactive elements adapted to be excited from a pump source; the combination comprising, a two wire transmission line adapted to have a pump source coupled to one end thereof and a terminating impedance connected to the outer end thereof and further having an electrical mid-point along its length, and means coupling the respective reactive elements of each of the parametrons to corresponding points above and below the electrical mid-point of said transmission line.

2. The combination set forth in claim 1 wherein the corresponding points are different for each parametron.

3. The combination of claim 2 wherein the reactive elements are capacitors.

4. The combination of claim 2 wherein the reactive elements are inductors.

5. The combination of claim 4 wherein the transmission line is magnetic and forms in part the inductor of each of said parametrons.

6. The combination of claim 1 wherein the transmission line is hair pin shaped and the corresponding points are on opposite sides of the bend in the transmission line.

7. The combination of claim 6 wherein the reactive elements are inductors and the transmission line is magnetic and forms in part the inductors of each of the parametrons.

References Cited

UNITED STATES PATENTS

| | | | |
|---|---|---|---|
| 3,051,843 | 8/1962 | Goto | 307—88 |
| 3,126,486 | 3/1964 | McMillan | 307—88 |
| 3,351,771 | 11/1967 | Miller et al. | 307—88 |
| 3,051,843 | 8/1962 | Goto | 307—88 |
| 3,227,890 | 1/1966 | Lo et al. | 307—88 |
| 3,361,913 | 1/1968 | Kaufman | 307—88 |

FOREIGN PATENTS 144,055  8/1961  U.S.S.R.

BERNARD KONICK, *Primary Examiner.*

J. F. BREIMAYER, *Assistant Examiner.*